3,846,157
PROCESS FOR PRODUCING PEWTER EFFECTS
Ernst Halberstadt, Sunset Island, Onset, Mass. 02558
No Drawing. Filed May 8, 1972, Ser. No. 251,049
Int. Cl. B44c *1/20;* B44d *1/44*
U.S. Cl. 117—64 R      1 Claim

ABSTRACT OF THE DISCLOSURE

A coating composition consisting of a binder such as clear varnish or lacquer, and powdered graphite either alone or in combination with aluminum flakes. The graphite is in excess of the amount which will be retained by the binder when dry, so that some of the graphite remains as loose powder on the surface of the coating. The coating is applied to a base material such as china, plastic, or wood and thoroughly dried. The coated object is then buffed, the excess graphite on the surface serving as a buffing powder.

---

This invention relates to metallic coatings, and more particularly to a coating which imparts a pewter-like appearance to articles of various kinds.

BACKGROUND OF THE INVENTION

Pewter has long been used for tableware and decorative objects, but is relatively expensive. The principal object of this invention is to provide a coating which will impart a pewter-like appearance to objects made of other materials such as china, glass, less expensive metal, or wood. Another object is to provide a simple and inexpensive process for producing pewter effects on objects made of such base materials. Still another object is to provide a coating which can produce a variety of pewter-like finishes ranging in appearance from that of bright new pewter to very dark or antique.

SUMMARY

The coating here described consists essentially of a clear liquid binder, such as varnish or lacquer, in which powdered graphite has been mixed. The amount of graphite is in excess of that which will be retained by the binder, when dry, so that loose graphite remains on the surface of the coating. The coated object is then buffed, with the loose graphite acting as a buffing powder, to impart the desired sheen. Aluminum flakes can also be added to the coating for a brighter, more silvery appearance.

The coating may be applied by spray, brush or any usual painting method. The base material is prepared as if for varnishing. The coating is thoroughly air dried, then buffed with a soft cloth, by hand or in a buffing machine.

EXAMPLE I

A binder was prepared by mixing the following:

30 parts by weight acrylic lacquer
60 parts acrylic lacquer thinner
10 parts retarder.

The coating was then prepared by mixing the following in parts by weight:

130 parts binder as prepared above
6 parts 300 mesh screened graphite powder
.5 parts 300 mesh screened aluminum flakes.

The coating was applied to a base material, then dried and buffed, resulting in a finish having the appearance of antique pewter.

EXAMPLE II

The binder was prepared as in Example I, then mixed to form the coating as follows:

130 parts binder
6.5 parts graphite powder
1.5 parts aluminum flakes.

The coating when applied to an article and dried and buffed gave the appearance of bright new pewter.

EXAMPLE III

The binder was prepared as in Example I, and the coating mixed as follows:

130 parts binder
5 parts graphite powder.

This coating, when applied, dried and buffed, gave the effect of dark antique pewter.

EXAMPLE IV

The binder was prepared as in Example I, then mixed to form a coating as follows:

130 parts binder
10 parts graphite powder.

The coating was applied, dried, and buffed. The resulting appearance was similar to very dark, very old pewter.

In general a proportion of 13 to 26 parts binder to one of graphite powder will yield a coating with enough excess graphite to act as the buffing agent. The aluminum can be varied according to the brightness desired in the finished article.

What is claimed is:

1. The process of imparting a pewter-like surface to a base material which comprises mixing a coating of clear liquid lacquer-like binder with powdered graphite in proportions in the range of 13 to 26 parts by weight of binder to one part of graphite and in a relationship to produce free graphite in the coating when dried, applying the coating to the base material, drying the coating to leave free graphite therein, and polishing the coated material using the free graphite in the coating as a buffer.

References Cited
UNITED STATES PATENTS

| | | | |
|---|---|---|---|
| 3,632,539 | 1/1972 | Sahni | 117—161 |
| 3,399,082 | 8/1968 | Henderson | 117—226 |
| 3,234,038 | 2/1966 | Stephens | 117—131 |
| 2,954,552 | 9/1960 | Halpern | 117—161 A |
| 2,709,453 | 5/1955 | Balis | 117—64 R |
| 2,664,453 | 12/1953 | Lang | 117—161 A |
| 1,638,097 | 8/1927 | Kingsley | 117—64 R |

FOREIGN PATENTS

| | | | |
|---|---|---|---|
| 641,507 | 5/1962 | Canada | 117—64 R |

LEON D. ROSDOL, Primary Examiner

M. F. ESPOSITO, Assistant Examiner

U.S. Cl. X.R.

117—19, 160 R, C, 226